United States Patent
Zhou et al.

(10) Patent No.: US 11,582,700 B2
(45) Date of Patent: Feb. 14, 2023

(54) APPLICABLE TIME FOR MAC-CE BASED PATH LOSS REFERENCE SIGNAL (PL RS) UPDATE

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/147,628

(22) Filed: Jan. 13, 2021

(65) Prior Publication Data

US 2021/0266844 A1    Aug. 26, 2021

Related U.S. Application Data

(60) Provisional application No. 62/981,017, filed on Feb. 24, 2020.

(51) Int. Cl.
*H04W 52/24* (2009.01)
*H04L 5/00* (2006.01)
(Continued)

(52) U.S. Cl.
CPC ......... *H04W 52/242* (2013.01); *H04L 5/0048* (2013.01); *H04L 5/0055* (2013.01); *H04W 52/146* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 11,133,877 B2 * | 9/2021 | Ryu | H04W 52/146 |
| 2015/0085787 A1 * | 3/2015 | Ouchi | H04L 5/0094 |
| | | | 370/329 |
| 2017/0201289 A1 * | 7/2017 | Zhang | H04W 72/085 |
| 2019/0312698 A1 | 10/2019 | Akkarakaran et al. | |
| 2020/0053710 A1 | 2/2020 | Molavianjazi et al. | |
| 2020/0088837 A1 * | 3/2020 | Kim | G01S 5/14 |
| 2020/0100248 A1 * | 3/2020 | Kim | H04L 5/0092 |

(Continued)

OTHER PUBLICATIONS

International Search Report and Written Opinion—PCT/US2021/013459—ISA/EPO—dated Apr. 21, 2021.
(Continued)

*Primary Examiner* — Hassan A Phillips
*Assistant Examiner* — Gautam Sharma
(74) *Attorney, Agent, or Firm* — Patterson & Sheridan, L.L.P.

(57) ABSTRACT

Aspects of the present disclosure relate to wireless communications, and more particularly, to techniques for determining application timing for path loss reference signals (PL RS). For example, the application timing is determined by determining an applicable time for a medium access control control element (MAC-CE) based PL RS for physical uplink control channel (PUCCH) and other uplink transmissions. A user equipment (UE) may receive a MAC-CE indicating a PL RS update and determine the applicable time for applying the PL RS update based on one or more conditions. The applicable time may be a period after acknowledgement of the MAC-CE or correspond to a certain measurement sample of a new PL RS a period after acknowledgement of the MAC-CE. The one or more conditions may relate to a total configured number of PL RS for the UE, whether a MAC-CE based PL RS activation feature is enabled, among others.

46 Claims, 16 Drawing Sheets

Case 1

(51) Int. Cl.
*H04W 52/14* (2009.01)
*H04W 72/21* (2023.01)

(56) References Cited

U.S. PATENT DOCUMENTS

| | | | | |
|---|---|---|---|---|
| 2020/0221405 | A1* | 7/2020 | Zarifi | H04W 52/50 |
| 2021/0185617 | A1* | 6/2021 | Zhou | H04W 52/146 |
| 2021/0259021 | A1* | 8/2021 | Huang | H04W 74/0833 |
| 2021/0259038 | A1* | 8/2021 | Paterson | H04L 5/0055 |
| 2021/0266844 | A1* | 8/2021 | Zhou | H04L 5/0048 |
| 2021/0352741 | A1* | 11/2021 | Mo | H04W 72/02 |
| 2022/0078731 | A1* | 3/2022 | He | H04L 5/00 |
| 2022/0124630 | A1* | 4/2022 | You | H04W 52/242 |

OTHER PUBLICATIONS

QUALCOMM: "Applicable Timing for Pathloss RS Activated/Updated by MAC-CE," 3GPP Draft, 3GPP TSG-RAN WG4 RAN4#93, R4-1914980, 3rd Generation Partnership Project (3GPP), Mobile Competence Centre, 650, Route Des Lucioles, F-06921, Sophia-Antipolis Cedex, France, vol. RAN WG4. No. Reno, Nevada, Nov. 18, 2019-Nov. 22, 2019, Nov. 8, 2019 (Nov. 8, 2019), XP051819259, 4 pages, Retrieved from the Internet: URL: https://ftp.3gpp.org/tsg_ran/WG4_Radio/TSGR4_93/Docs/R4-1914980.zip Radio R4-1914980. docx [retrieved on Nov. 8, 2019] section 2.3.

QUALCOMM Incorporated: "Design of MIMO DL MAC CE", 3GPP Draft, 3GPP TSG-RAN WG2 Meeting #109 Electronic, R2-2001034, 3rd Generation Partnership Project (3GPP), Mobile Competence Centre, 650, Route Des Lucioles, F-06921, Sophia-Antipolis Cedex, France, vol. RAN WG2, No. Feb. 24, 2020-Mar. 6, 2020, Feb. 14, 2020 (Feb. 14, 2020), XP051849450, 10 pages, Retrieved from the Internet: URL:https://ftp.3gpp.org/tsg_ran/WG2_RL2/TSGR2_109_e/Docs/R2-2001034.zip R2-2001034_Design of MIMO DL MAC CEs_v1.docx [retrieved on Feb. 14, 2020] Sections 2-3, the Whole Document.

* cited by examiner

APPLICABLE TIME FOR MAC-CE BASED PATH LOSS REFERENCE SIGNAL (PL RS) UPDATE

CROSS-REFERENCE TO RELATED APPLICATION(S)

This application claims benefit of and priority to U.S. Provisional Patent Application No. 62/981,017, filed Feb. 24, 2020, which is assigned to the assignee hereof and herein incorporated by reference in its entirety as if fully set forth below and for all applicable purposes.

INTRODUCTION

Aspects of the present disclosure relate to wireless communications, and more particularly, to techniques for determining an applicable time for a media access control control element (MAC-CE) based path loss reference signal (PL RS).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a user equipment (UE). The method generally includes receiving a medium access control (MAC) control element (CE) indicating a path loss reference signal (PL RS) update and determining a time for applying the PL RS update based on one more conditions.

Certain aspects provide a method for wireless communication performed by a network entity. The method generally includes sending a UE a medium access control (MAC) control element (CE) indicating a path loss reference signal (PL RS) update and determining a time for the UE to apply the PL RS update based on one more conditions.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
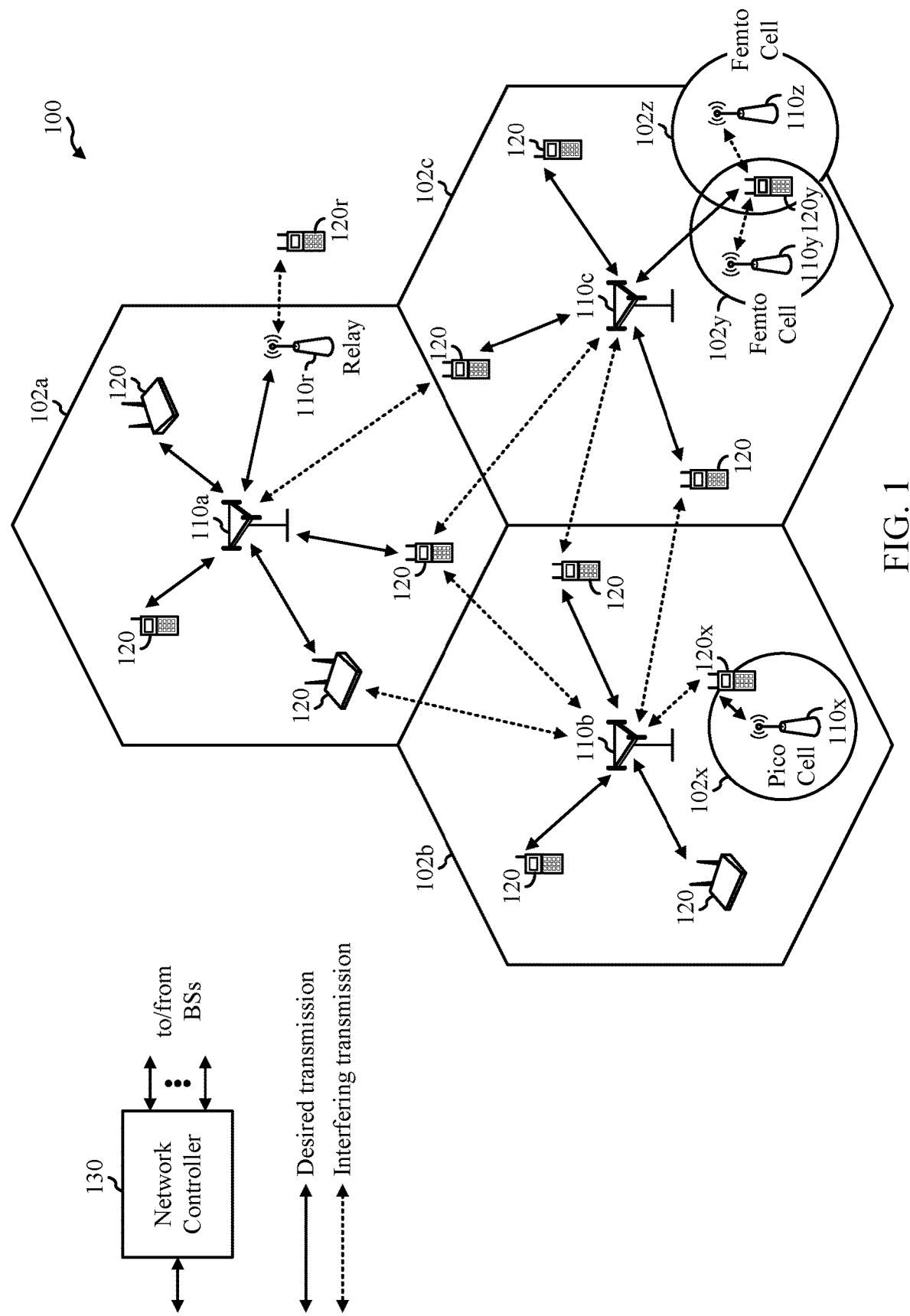
FIG. 1 is a block diagram conceptually illustrating an example telecommunications system, in accordance with certain aspects of the present disclosure.

Aspects of the present disclosure relate to wireless communications, and more particularly, to techniques for determining an applicable time for a medium access control control element (MAC-CE) based path loss reference signal (PL RS). For example, a user equipment (UE) can be configured with multiple PL RS' by radio resource control (RRC) and one of the PL RS' can be activated or updated by the MAC-CE. For such MAC-CE based PL RS activation, application time (i.e., applicable time) may be determined for the newly activated PL RS power control, such as of one of sounding reference signals (SRS), physical uplink shared channel (PUSCH), or physical uplink control channel (PUCCH). The present disclosure provides methods for determining an applicable time for applying the PL RS update indicated by the MAC-CE based on one or more conditions (e.g., in different scenarios).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 1000 of FIG. 10 to process PR RS sent from a network entity (performing operations 1100 of FIG. 11).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
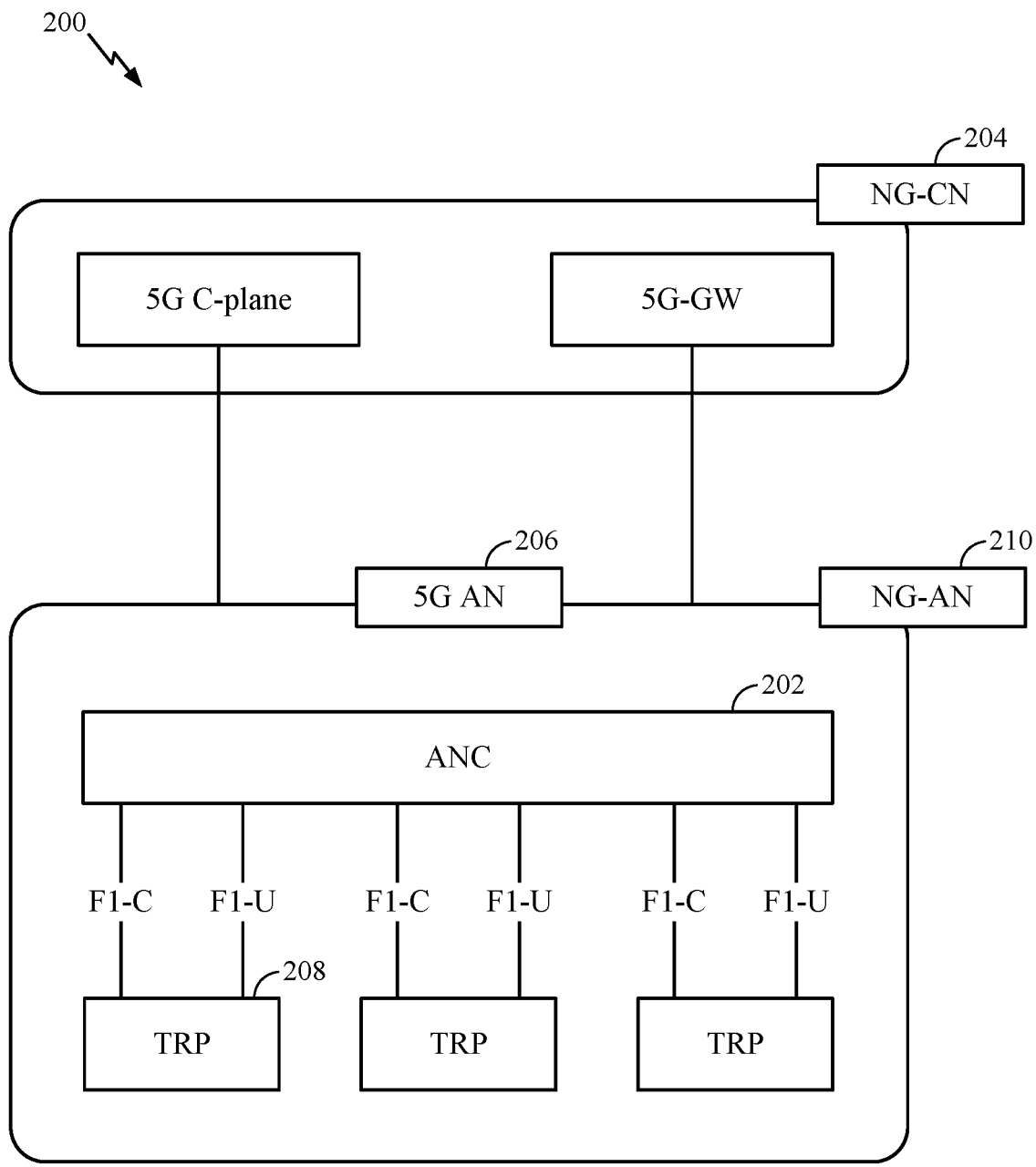
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
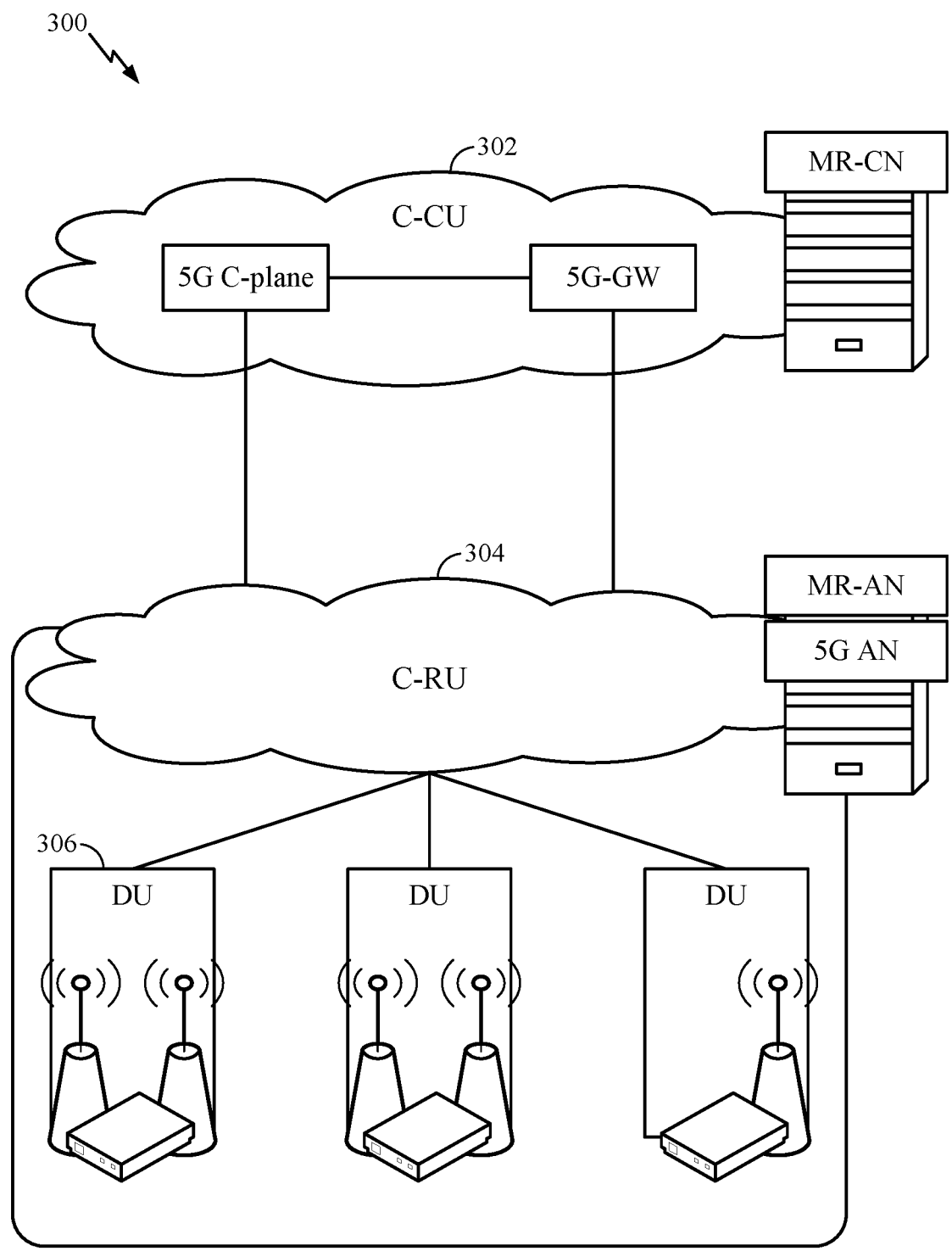
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
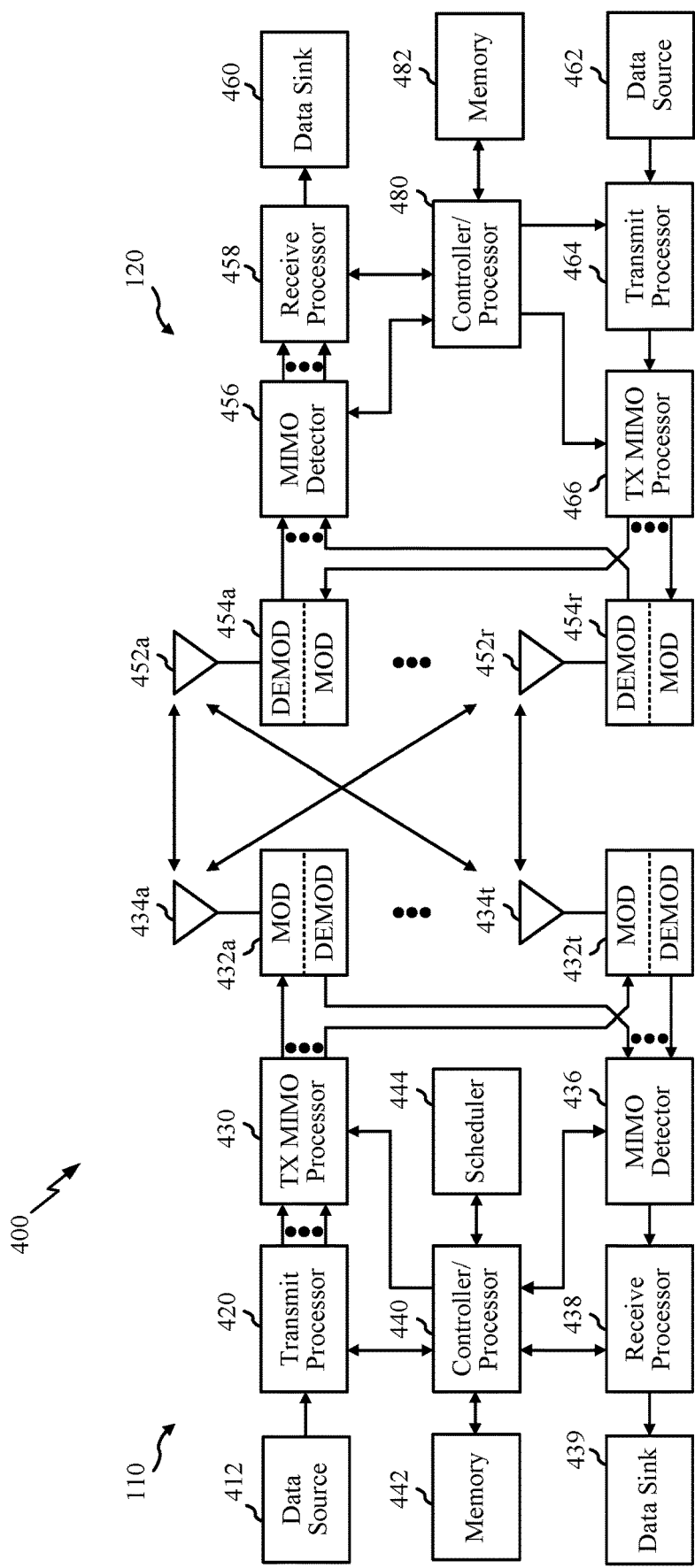
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations 1000 of FIG. 10, while antennas 434, processors 420, 460, 438, and/or controller/processor 440 of the BS 110 may be used to perform operations 1100 of FIG. 11.

At the BS 110, a transmit processor 420 may receive data from a data source 412 and control information from a controller/processor 440. The control information may be for the physical broadcast channel (PBCH), physical control format indicator channel (PCFICH), physical hybrid ARQ (automated repeat request, or HARQ) indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, antennas 452a through 452r may receive downlink signals from the base station 110 and may provide received signals to demodulators (DEMODs) in transceivers 454a through 454r, respectively. Each demodulator 454 may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the base station 110 and the UE 120, respectively. The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the downlink and/or uplink.

Figure 5:
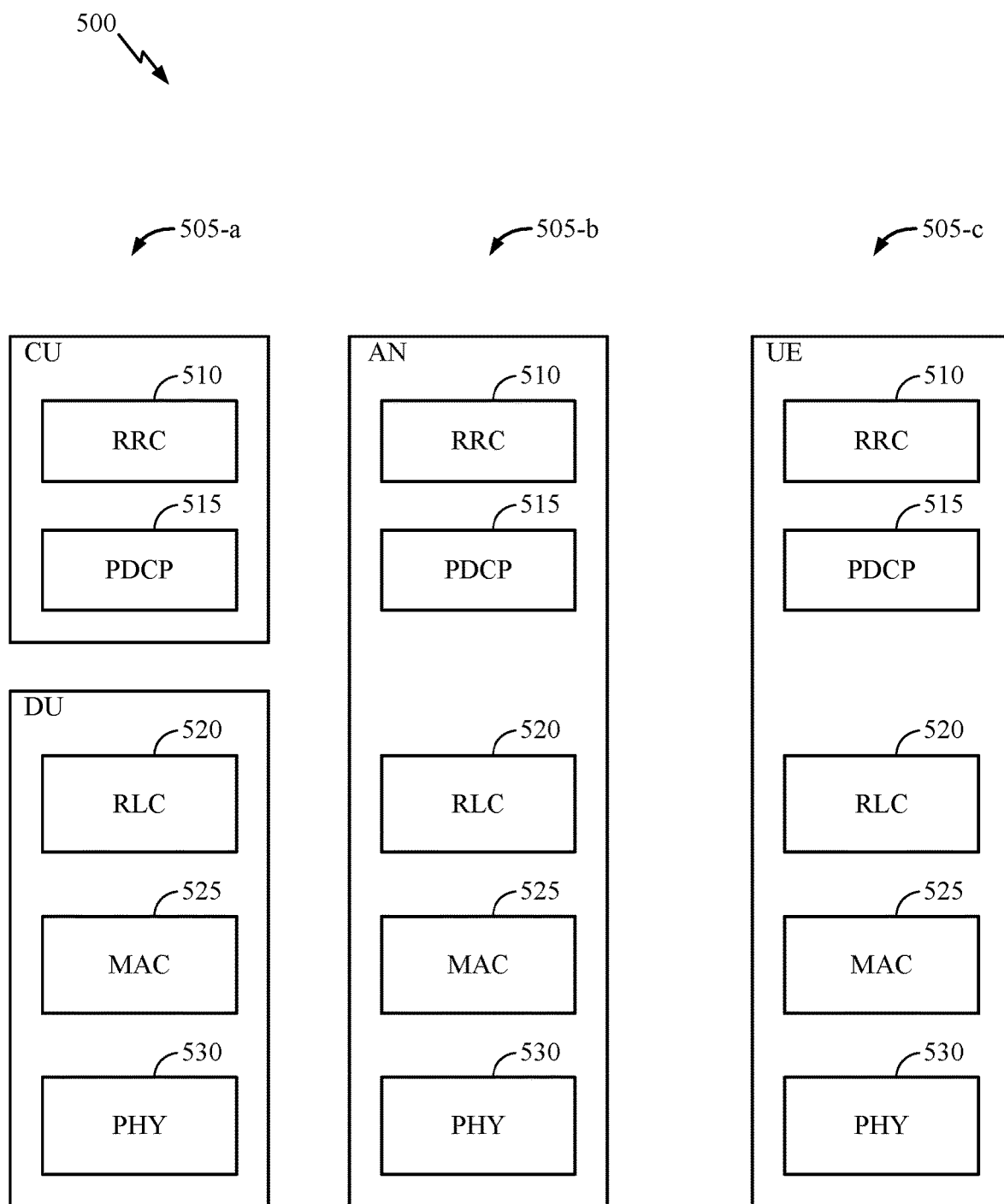
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
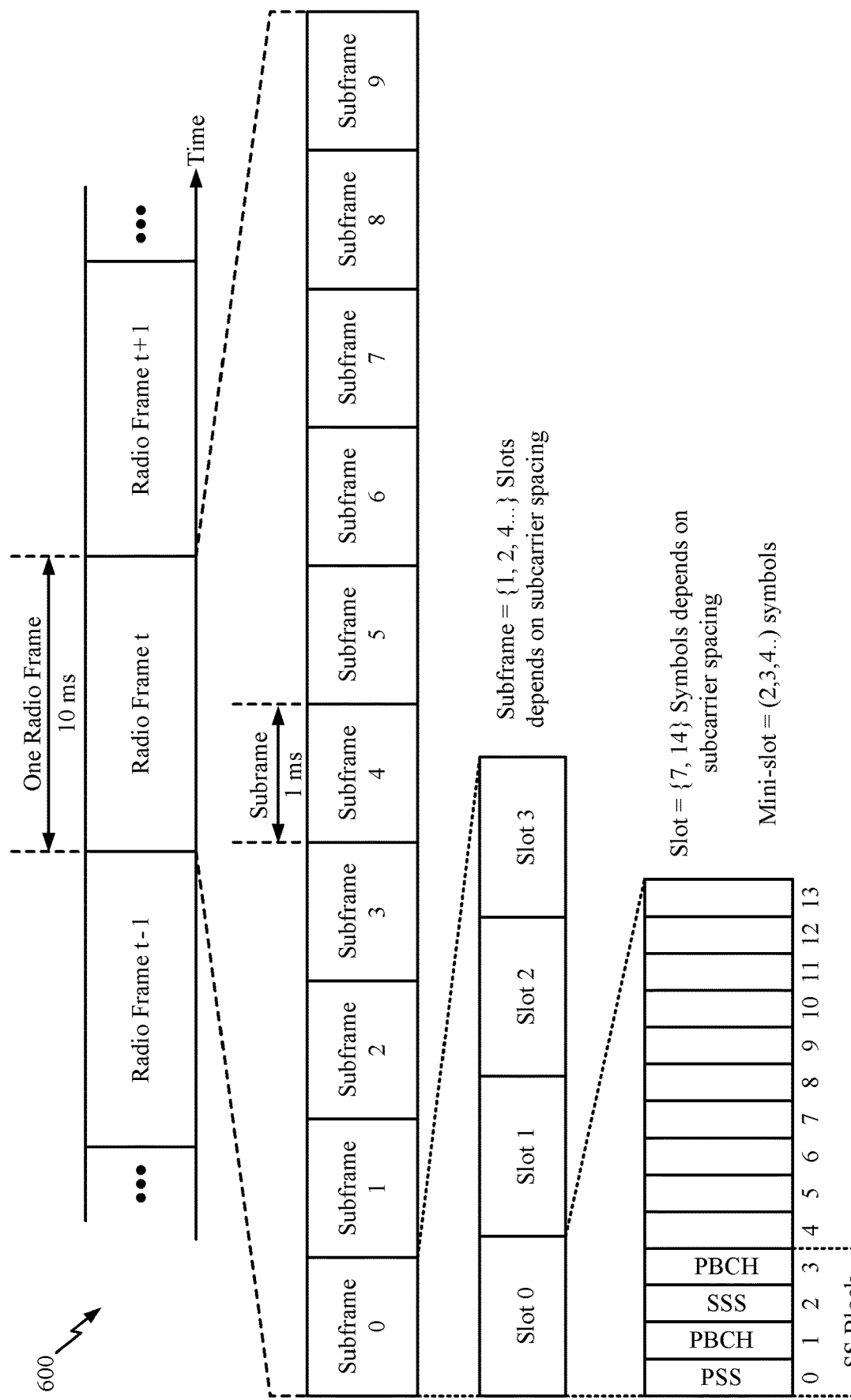
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 7:
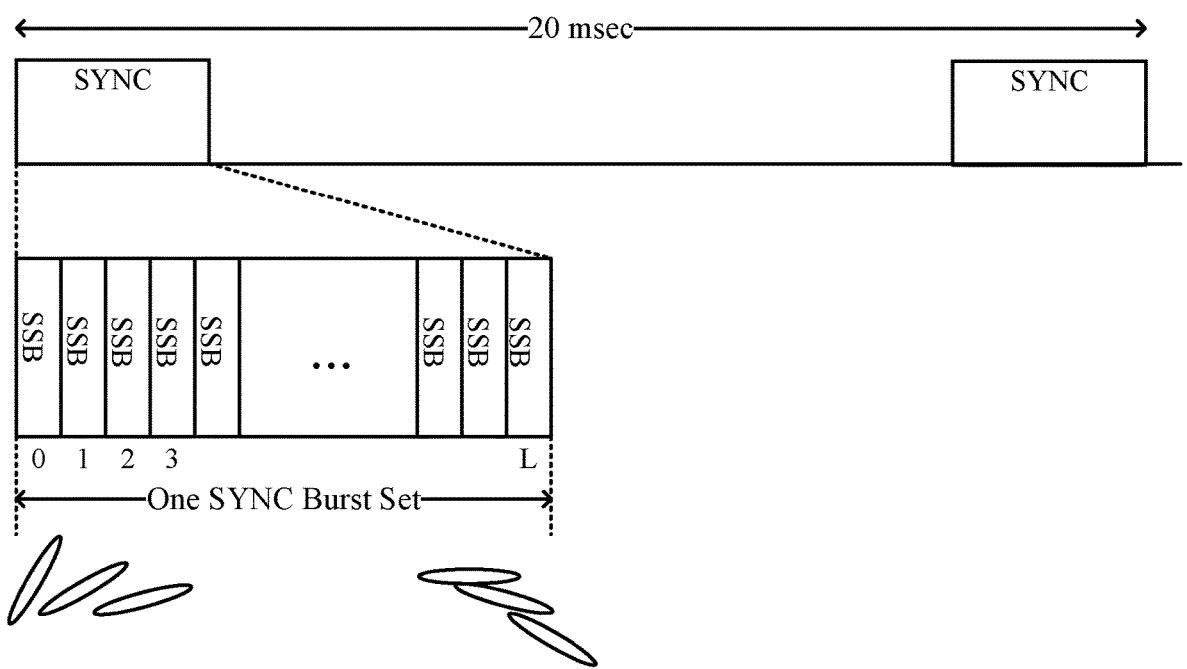
FIG. 7 illustrates how different synchronization signal blocks (SSBs) may be sent using different beams, in accordance with certain aspects of the present disclosure.

As shown in FIG. 7, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
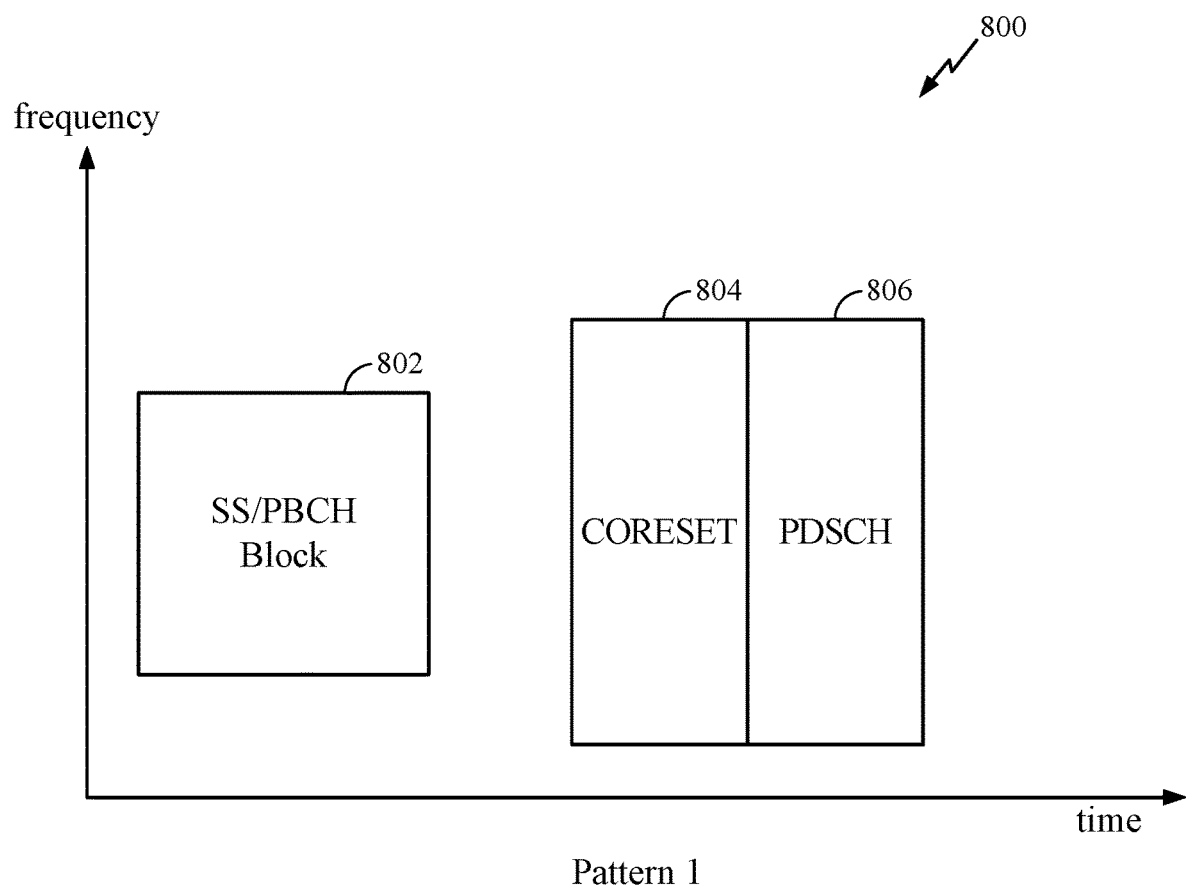
FIG. 8 shows an exemplary transmission resource mapping, according to aspects of the present disclosure.

FIG. 8 shows an exemplary transmission resource mapping 800, according to aspects of the present disclosure. In the exemplary mapping, a BS (e.g., BS 110a, shown in FIG.

1) transmits an SS/PBCH block 802. The SS/PBCH block includes a MIB conveying an index to a table that relates the time and frequency resources of the CORESET 804 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 806. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

Figure 9:
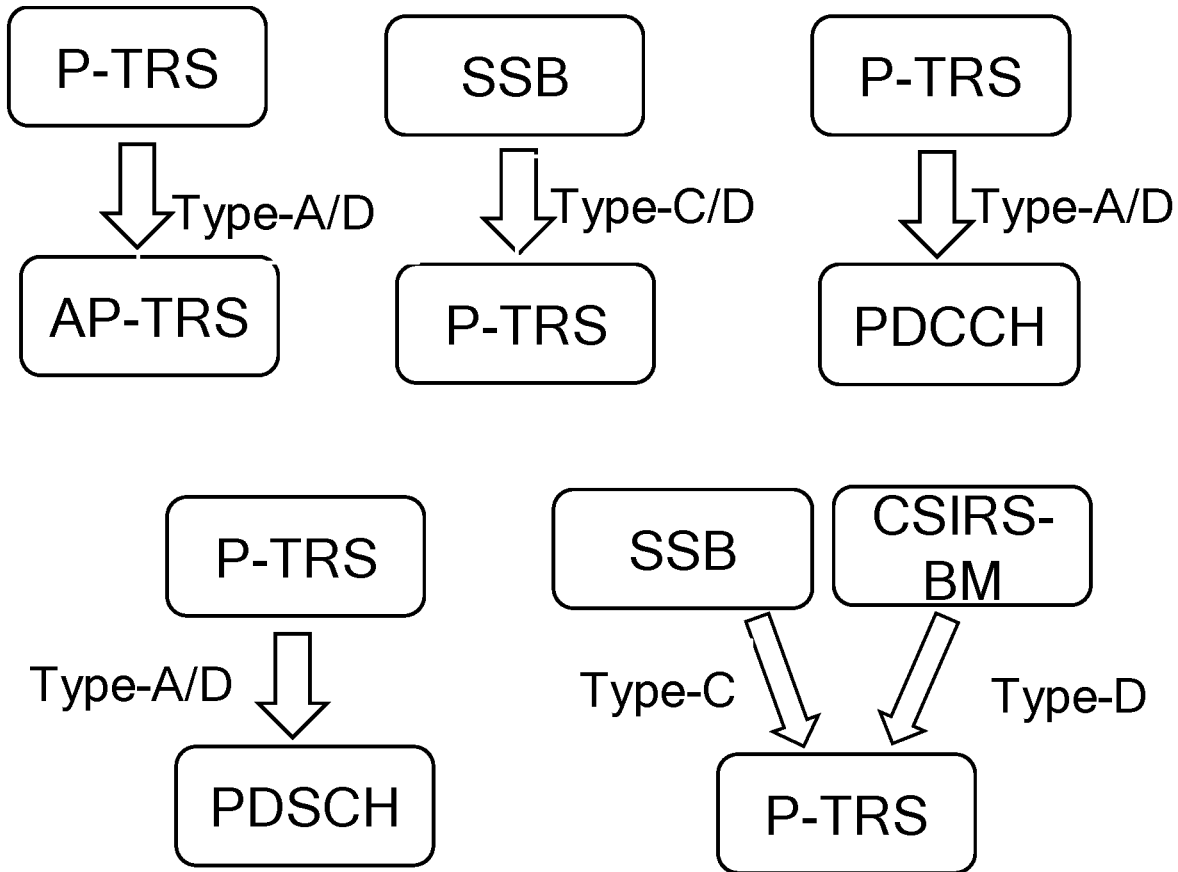
FIG. 9 illustrates example quasi co-location (QCL) relationships.

FIG. 9 illustrate examples of the association of DL reference signals with corresponding QCL types that may be indicated by a TCI-RS-SetConfig.

In the examples of FIG. 9, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 9, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the Search Space IE is another RRC IE that defines how and where to search for PDCCH candidates for a given CORESET. Each search space is associated with one CORESET. The Search Space IE identifies a search space configured for a CORESET by a search space ID. In an aspect, the search space ID associated with CORESET #0 is Search Space ID #0. The search space is generally configured via PBCH (MIB).

Example PL RS Usage

A UE may receive a PL RS from a BS. The UE may measure the PL RS to determine downlink channel quality between the UE and the BS. For example, based on the measurement of the PL RS, the UE may estimate path loss (or path attenuation) between the UE and the BS on the downlink. In certain aspects, the estimated path loss on the downlink may also be applicable to estimated path loss on a corresponding uplink (e.g., when the downlink and uplink have similar channel conditions). For example, the UE also determines estimated path loss on an uplink based on the measured PL RS.

In certain aspects, the PL RS is associated with one or more types of uplink transmission. For example, the BS may transmit a plurality of different PL RS (or PL RS', interchangeable herein), where each PL RS is associated with a particular one or more types of uplink transmission such as one or more of a physical uplink shared channel (PUSCH), a sounding reference signal (SRS), an aperiodic SRS (AP-SRS), a semi-persistent SRS (SP-SRS), a periodic SRS (P-SRS), or a physical uplink control channel (PUCCH). In some cases, the BS may configure the UE with multiple PL RS by radio resource control (RRC) signaling and activate or update one of the multiple PL RS via medium access control control element (MAC-CE) for an SRS set.

In some examples, a second radio access network (RAN) may provide further signaling details. Higher layer filtered reference signal received power (RSRP) may be reused for path loss measurement and used to define an application time in some situations. In one specific example, the next slot after the $N^{th}$ measurement sample, wherein the first measurement sample corresponds to the first instance, or three milliseconds after sending acknowledgement (ACK) for the MAC-CE, may be used as the application time. In this example, N may be an integer such as five.

Some conditions or assumptions may be apply for the determination of the application time. For example, the determination may assume the UE supports the number of RRC-configurable PL RS greater than a certain number, such as four, for the case that the activated PL RS by the MAC-CE is not tracked. In such cases, the UE may only be required to track the activated PL RS if the number of PL RS configured by RRC is greater than the number. The UE may determine whether to update the filtered RSRP value for the previous PL RS 3 ms after sending ACK for the MAC-CE. An LS may be sent to RAN4 to validate these conditions.

In certain aspects, based on measuring the PL RS and determining estimated path loss between the UE and the BS, the UE is configured to perform uplink power control. For example, in certain aspects the UE is configured to perform uplink power control to adjust a transmission power used by the UE to transmit an uplink transmission of a type associated with the PL RS.

In certain aspects, the PL RS may be associated with a particular beam. For example, the UE and/or the BS may utilize beamforming for transmitting and/or receiving signals. In particular, the UE and/or the BS may utilize receive-side beamforming to perform beamforming when receiving signals, such that signals are received with increased gain (e.g., amplified) in a particular direction and decreased gain (e.g., attenuated) in other directions. Further, the UE and/or the BS may utilize transmit-side beamforming to perform beamforming when transmitting signals, such that signals are transmitted with increased gain (e.g., amplified) in a particular direction and decreased gain (e.g., attenuated) in other directions. A pair of a transmit beam, used by a device to send signals, and a receive beam, used by another device to receive signals, may be referred to as a beam pair or beam pair link. Accordingly, in certain aspects, the estimated path loss by the UE may be for a particular beam pair, a particular transmit beam of the BS, and or a particular receive beam of the UE.

In certain aspects, the UE utilizes or applies the PL RS for taking one or more actions. For example, based on the estimated path loss from measuring the PL RS, the UE may one or more of perform uplink power control, perform a handover from one BS to another, declare a radio link failure (RLF), perform downlink and/or uplink beam management, etc. For example, if the PL RS indicates that path loss between the UE and a BS is high (e.g., above a threshold), the UE may perform uplink power control. In another example, if the PL RS indicates that path loss between the UE and a BS is high, the UE may perform handover from the BS to another BS. In another example, if the PL RS indicates that path loss between the UE and a BS is high for a particular beam pair, the UE and/or BS may perform beam management procedure (e.g., beam selection procedures) to select a new beam pair for communication. In another example, if the PL RS indicates that path loss between the UE and a BS is high, the UE may increase transmit power for transmitting on an uplink or perform other uplink power control.

In certain aspects, a BS is configured to activate a particular PL RS, such as of a plurality of PL RSs transmitted by the BS, for a UE. In particular, in certain such aspects, the UE is configured to track, monitor, and/or measure the particular PL RS when activated. The particular PL RS may be associated with one or more of a particular transmit beam of the BS, a particular receive beam of the UE, or a particular uplink channel/transmission by the UE to the BS. Accordingly, measurement of the particular PL RS when activated may be used to perform an action, as discussed, with respect to a particular transmit beam of the BS, a particular receive beam of the UE, or a particular uplink channel/transmission by the UE to the BS.

Example Applicable Time for MAC-CE Based PUCCH PL RS Update

Activation of MAC-CE based path loss reference signal (PL RS) application time may be decided for newly activated PL RS for sounding reference signals (SRS) and physical uplink shared channel (PUSCH) power control. In some scenarios, the application time is unspecified for physical uplink control channel (PUCCH). The present disclosure provides methods (e.g., or techniques, also implementable as guidelines or rules) for determining the application time for PUCCH, SRS, or PUSCH to apply PL RS update based on one or more conditions.

Aspects of the present disclosure relate to wireless communications, and more particularly, to techniques for determining an applicable time for a MAC-CE based path loss reference signal (PL RS) for PUCCH and other uplink transmissions.

Figure 10:
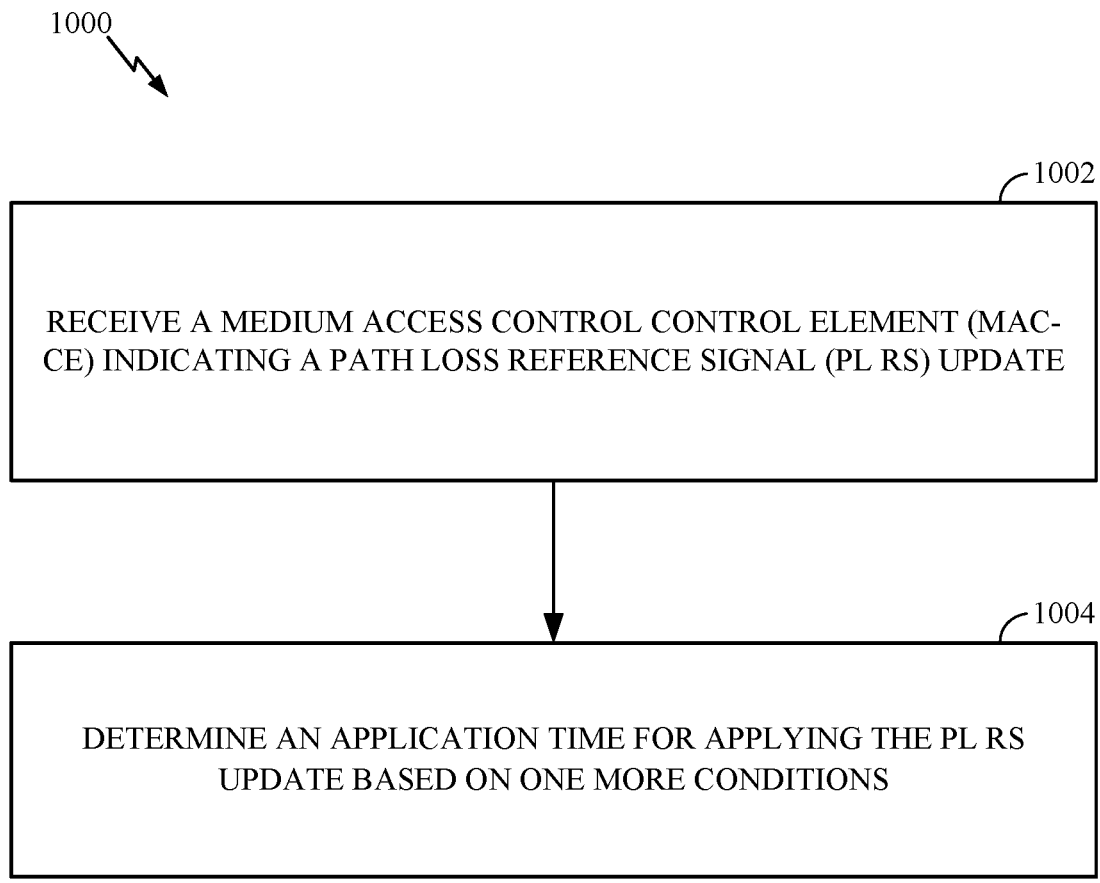
FIG. 10 illustrates example operations for wireless communication by a user equipment (UE), in accordance with some aspects of the present disclosure.

FIG. 10 illustrates example operations 1000 for wireless communication by a UE, in accordance with certain aspects of the present disclosure. The operations 1100 may be performed, for example, by a UE 120 of FIGS. 1 and 4.

Operations 1000 begin, at 1002, by receiving a medium access control (MAC) control element (CE) indicating a path loss reference signal (PL RS) update. For example, the UE may receive a MAC-CE updating PUCCH spatial relation.

At 1004, the UE determines a time for applying the PL RS update based on one more conditions. For example, as described in different scenarios below, the applicable time for applying the PL RS update may be different for different cases (each correspond to one or more conditions).

Figure 11:
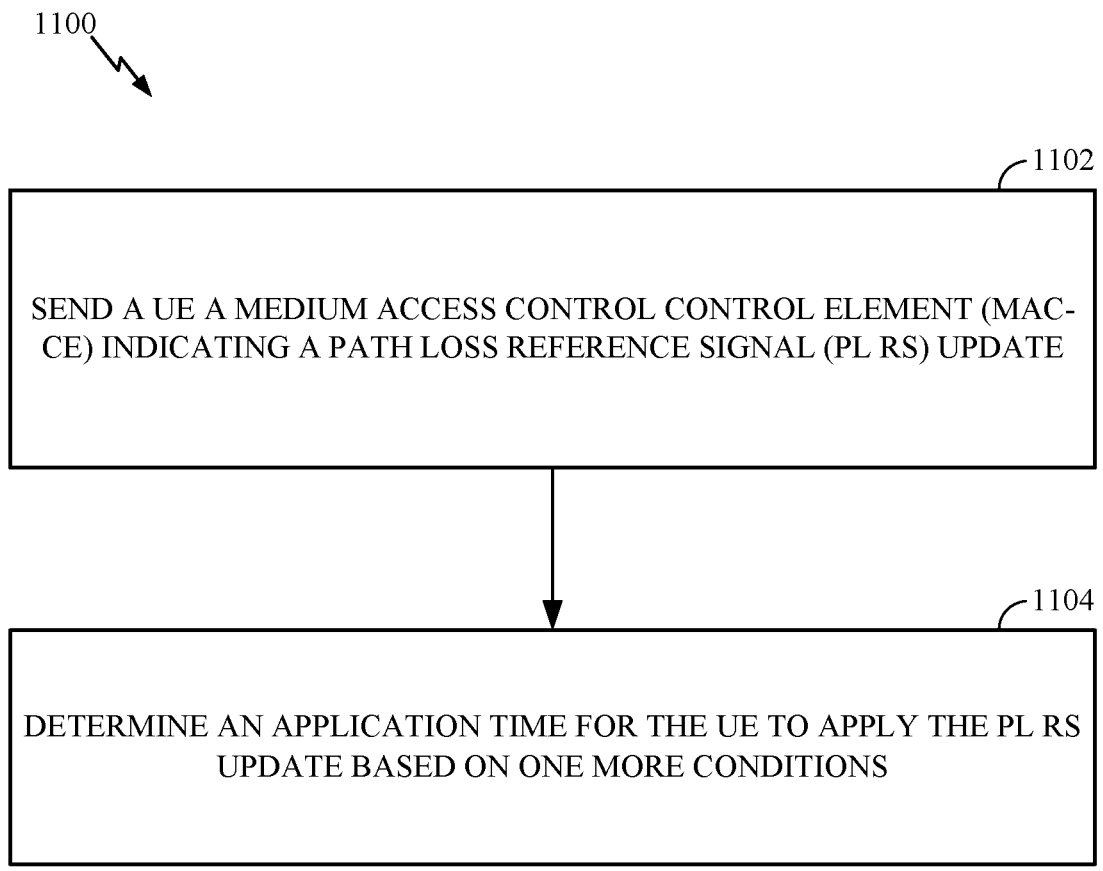
FIG. 11 illustrates example operations for wireless communication by a network entity, in accordance with some aspects of the present disclosure.

FIG. 11 is a flow diagram illustrating example operations 1100 for wireless communication by a network entity, and may be considered complementary to operations 1000 of FIG. 10. For example, operations 1100 may be performed, for example, by a BS 110 (e.g., a gNB) of FIGS. 1 and 4, in conjunction with a UE 120 performing operations 1000 of FIG. 10.

Operations 1100 begin, at 1102, by sending a UE a medium access control (MAC) control element (CE) indicating a path loss reference signal (PL RS) update.

At 1104, the network entity determining a time for the UE to apply the PL RS update based on one more conditions. For example, the time (or applicable time) determined by the network entity is for the UE to apply the PL RS update, when some of the one or more conditions are satisfied.

In certain aspects, the applicable time or application time for MAC-CE based PUCCH PL RS update may depend on the following cases and conditions.

In certain aspects, the one or more conditions relate to at least one of a total configured number of PL RS for the UE, whether a MAC-CE based PL RS activation feature is enabled, or whether a same PL RS is already measured or maintained for power control of one or more other uplink channels.

In certain aspects, the one or more conditions relate to at least one of: if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE. For example, the certain type includes at least one of a synchronization signal block (SSB) or a channel state information reference signal (CSI-RS).

Figure 12:
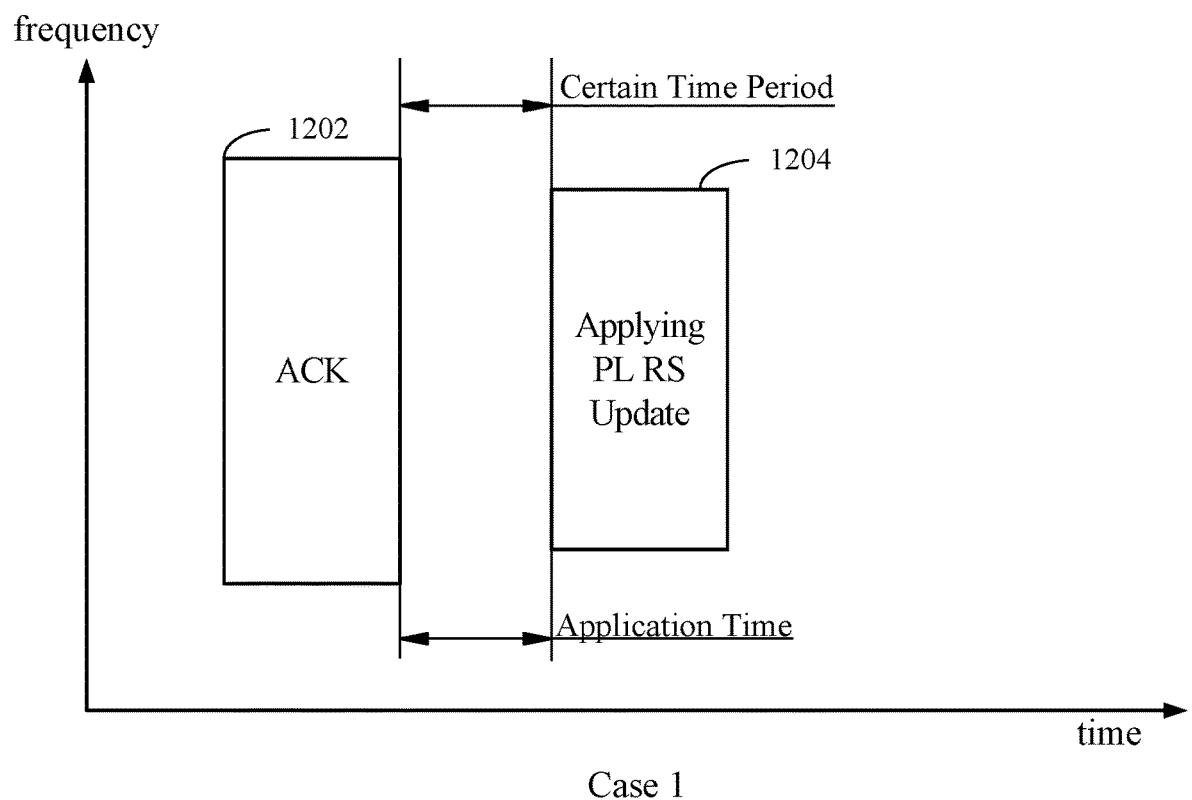
FIG. 12 shows an example application time for applying path loss (PL) reference signal (RS) update, according to aspects of the present disclosure.

In certain aspects, the application time is determined to be a period after acknowledgement of the MAC-CE. For example, the PL RS applicable time may be three milliseconds after the end of an acknowledgment (ACK) by the UE for PDSCH carrying MAC-CE updating PUCCH spatial relation as well as corresponding PL RS, subject to one or more following conditions (as example applications of the one or more conditions mentioned above). FIG. 12 illustrates an example (Case 1) of the application time being a certain time period after ACK. As shown, the application time between the ACK 1202 and applying PL RS update at 1204 equals to the certain timer period, such as 3 ms, after the ACK 1202. The certain time period may be defined as another value subject to the conditions below.

For example, one condition may be that the total configured PL RS number is no more than a limit (e.g., where the total configured PL RS limit is four, the total configured PL RS number may not be more than four). The total configured PL RS can be for PUSCH/PUCCH/SRS/physical random access channel (PRACH) power control (PC), or just for PUCCH PC. One condition may be that the MAC-CE based PL RS activation feature is disabled, (e.g., if a corresponding RRC flag enablePLRSupdateForPUSCHSRS is turned off). One condition may be that the same PL RS is already measured and/or maintained for PC of other UL channels, (e.g., PUSCH/SRS/PRACH). Satisfying one or more of these three conditions is sufficient for the applicable time to be three milliseconds after the end of ACK for PDSCH carrying MAC-CE updating PUCCH spatial relation and the corresponding PL RS.

Figure 13:
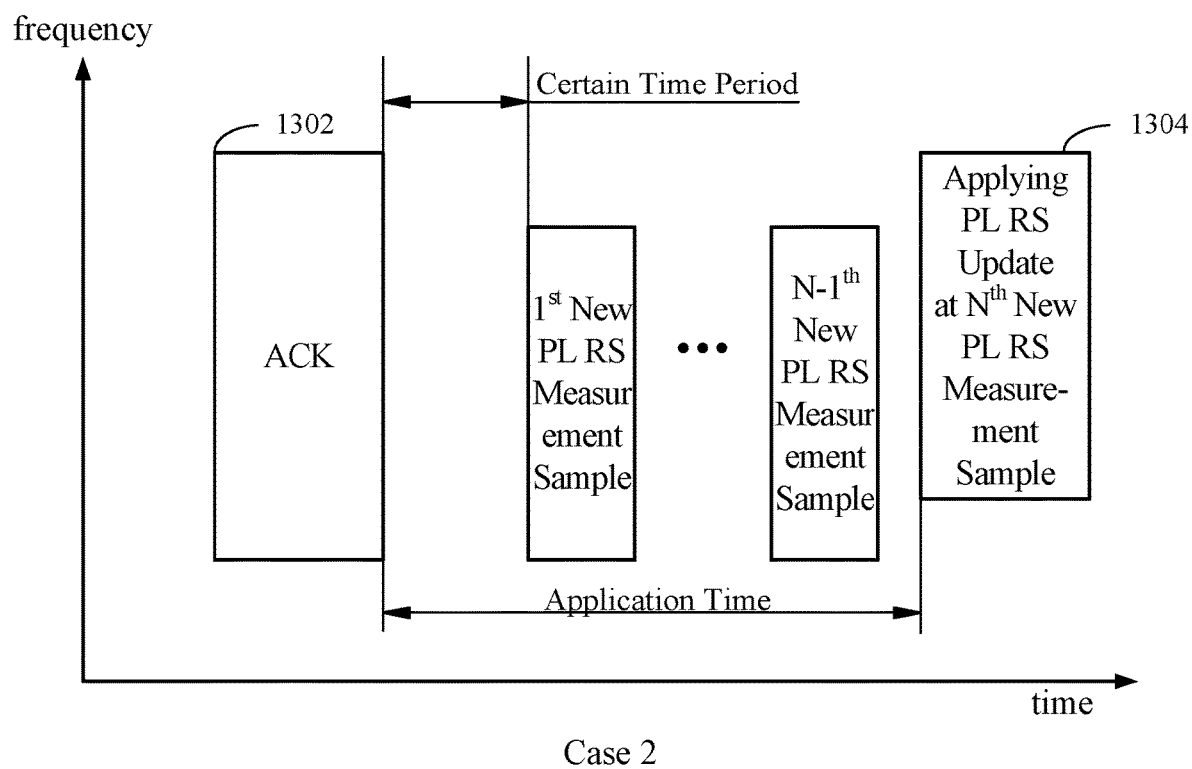
FIG. 13 shows another example application time for applying PL RS update, according to aspects of the present disclosure.

In certain aspects, the application time corresponds to a certain measurement sample of a new PL RS a period after acknowledgement of the MAC-CE. For example, the PL RS applicable time may be after a fifth measurement sample of the new PL RS, where the first measurement sample is the one after three milliseconds from the end of ACK for PDSCH carrying MAC-CE updating PUCCH spatial relation as well as corresponding PL RS, subject to one or more following conditions (as example applications of the one or more conditions mentioned earlier). FIG. 13 illustrates an example (Case 2) of the application time corresponding to a certain measurement sample of the new PL RS is shown in FIG. 13. As shown, the application time between the end of ACK 1302 and applying the PL RS update at 1304 equals to the certain time period between the first new PL RS measurement sample and the end of ACK 1302 and the duration corresponding to $N^{th}$ PL RS measurement samples.

One condition may be that the total configured PL RS number is no more than a limit (e.g., where the total configured PL RS limit is four, the total configured PL RS number may not be more than four). The total configured PL RS can be for PUSCH/PUCCH/SRS/physical random access channel (PRACH) PC, or just for PUCCH PC (i.e., the PL RS is specified for PC of the PUCCH only). One condition may be that the MAC-CE based PL RS activation feature is enabled, (i.e., corresponding RRC flag enablePLRSupdateForPUSCHSRS is turned on.) One condition may be that the same PL RS is not measured and/or maintained for PC of other UL channels, (e.g., PUSCH/SRS/PRACH).

One condition may be that the PL RS has a configured TCI state where the TCI state is "known" as described below. One condition may be that the PL RS has no configured TCI state, where such PL RS includes a standardized building block (SSB) and a periodic channel state information resource signal (CSI-RS). One condition may be that the PL RS has no configured TCI state and the PL RS is "known" as described below.

Figure 14:
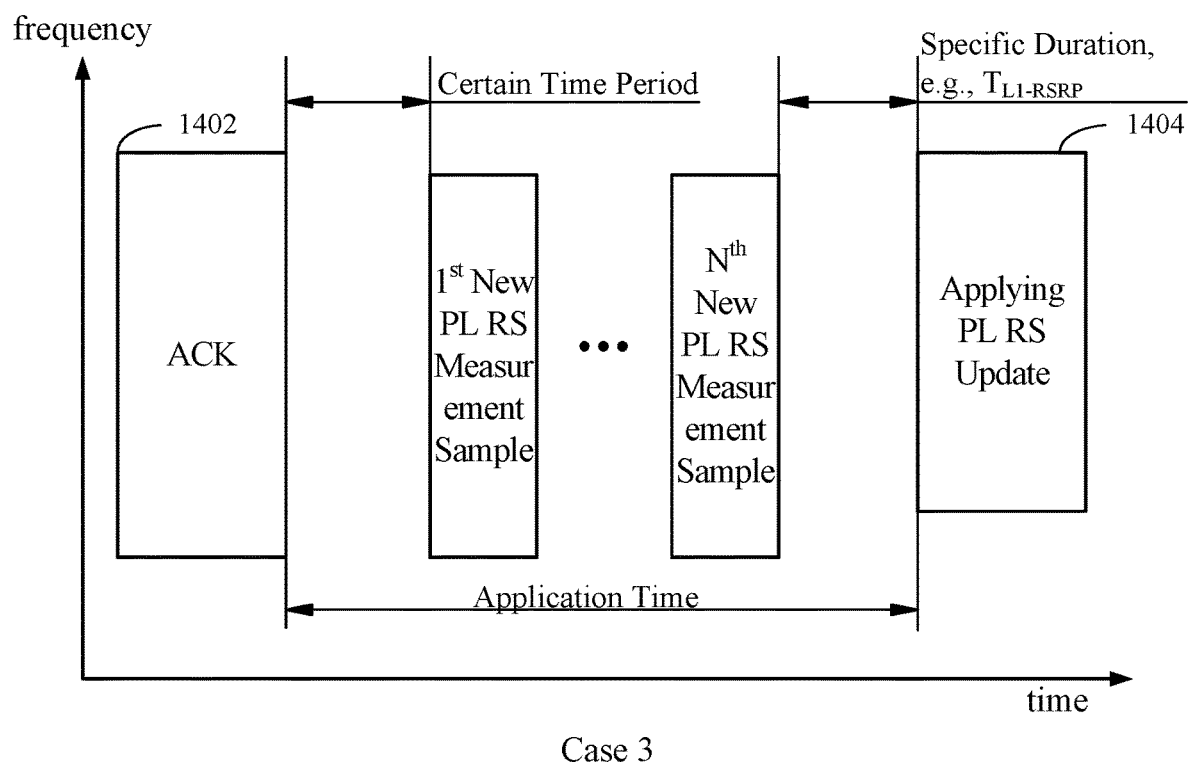
FIG. 14 shows yet another example application time for applying PL RS update, according to aspects of the present disclosure.

In certain aspects, the PL RS applicable time may be after a specific duration after a certain number of measurement sample (e.g., the fifth measurement sample) of the new PL RS, where a first measurement sample is the measurement after milliseconds from the end of ACK for PDSCH carrying MAC-CE updating PUCCH spatial relation as well as corresponding PL RS, subject to one or more conditions. FIG. 14 illustrates an example (Case 1) for applying PL RS update is shown in FIG. 14, between the end of the ACK 1402 and applying the PL RS update at 1404. As shown, the application time is determined based on a certain time period (e.g., 3 ms) after the end of ACK 1402, a certain number (e.g., N=5) of measurement samples of the new PL RS, and a specific duration thereafter. The specific duration may be $T_{L1\text{-}RSRP}$, as discussed below.

One condition may be that the total configured PL RS number is no more than a limit (e.g., where the total configured PL RS limit is four, the total configured PL RS number may not be more than four). The total configured PL RS can be for PUSCH/PUCCH/SRS/physical random access channel (PRACH) PC, or just for PUCCH PC. One condition may be that the MAC-CE based PL RS activation feature is enabled, (e.g., if a corresponding RRC flag enablePLRSupdateForPUSCHSRS is turned on). One condition may be that the same PL RS is not measured and/or maintained for PC of other UL channels, (e.g., PUSCH/SRS/PRACH.) One condition may be that the PL RS has a configured TCI state and the TCI state is "unknown." One condition may be that the PL RS has a configured TCI state where the TCI state is "known." One condition may be that the PL RS has no configured TCI state and the PL RS is "unknown."

For example, the specific duration can be $T_{L1\text{-}RSRP}$ as defined in TS 38.133 section 8.10.3 for required time for L1-RSRP report. $T_{L1\text{-}RSRP}$ is the time for L1-RSRP measurement for Rx beam refinement defined as (1) $T_{BM\_Measurement\_Period\_SSB}$ for SSB in FR2 as specified in clause 9.5.4.1, with the assumption of M=1, or (2) $T_{BM\_Measurement\_Period\_CSI\text{-}RS}$ for CSI-RS in FR2 as specified in clause 9.5.4.2, with the assumption of M=1 for periodic CSI-RS or for aperiodic CSI-RS if number of resources in resource set at least equal to MaxNumberRxBeam.

In certain aspects, the same rule of applicable time for MAC-CE based PUCCH PL RS update can also be applied to MAC-CE based PL RS update for other UL channels, including PUSCH/SRS/PRACH.

In certain aspects, the TCI state is considered "known" subject to one or more conditions (or when one or more of the following conditions are satisfied). One condition may be that during the period from the last transmission of the RS resource used for the L1-RSRP measurement reporting for the target TCI state to the completion of active TCI state switch, the RS resource for L1-RSRP measurement is the RS in target TCI state or QCLed to the target TCI state. One condition may be that the TCI state switch command is received within 1,280 milliseconds upon the last transmission of the RS resource for beam reporting or measurement. One condition may be that the UE has sent at least one L1-RSRP report for the target TCI state before the TCI state switch command. One condition may be that the TCI state remains detectable during the TCI state switching period. One condition may be that the SSB associated with the TCI state remain detectable during the TCI switching period (the SNR of the TCI state is greater than or equal to −3 dB). Otherwise, the TCI state is unknown.

In certain aspects, a "known" PL RS can be determined subject to one or more conditions. One condition may be that the UE receives activation command for a PL RS within a previous number of seconds within the last transmission of this PL RS. One condition may be that the UE has sent at least one measurement report for this PL RS. One condition may be that the PL RS and/or its SSB QCL source remain detectable during the PL RS switching period (the SNR of the TCI state is greater than or equal to −3 dB). Otherwise, the PL RS is unknown.

Figure 15:
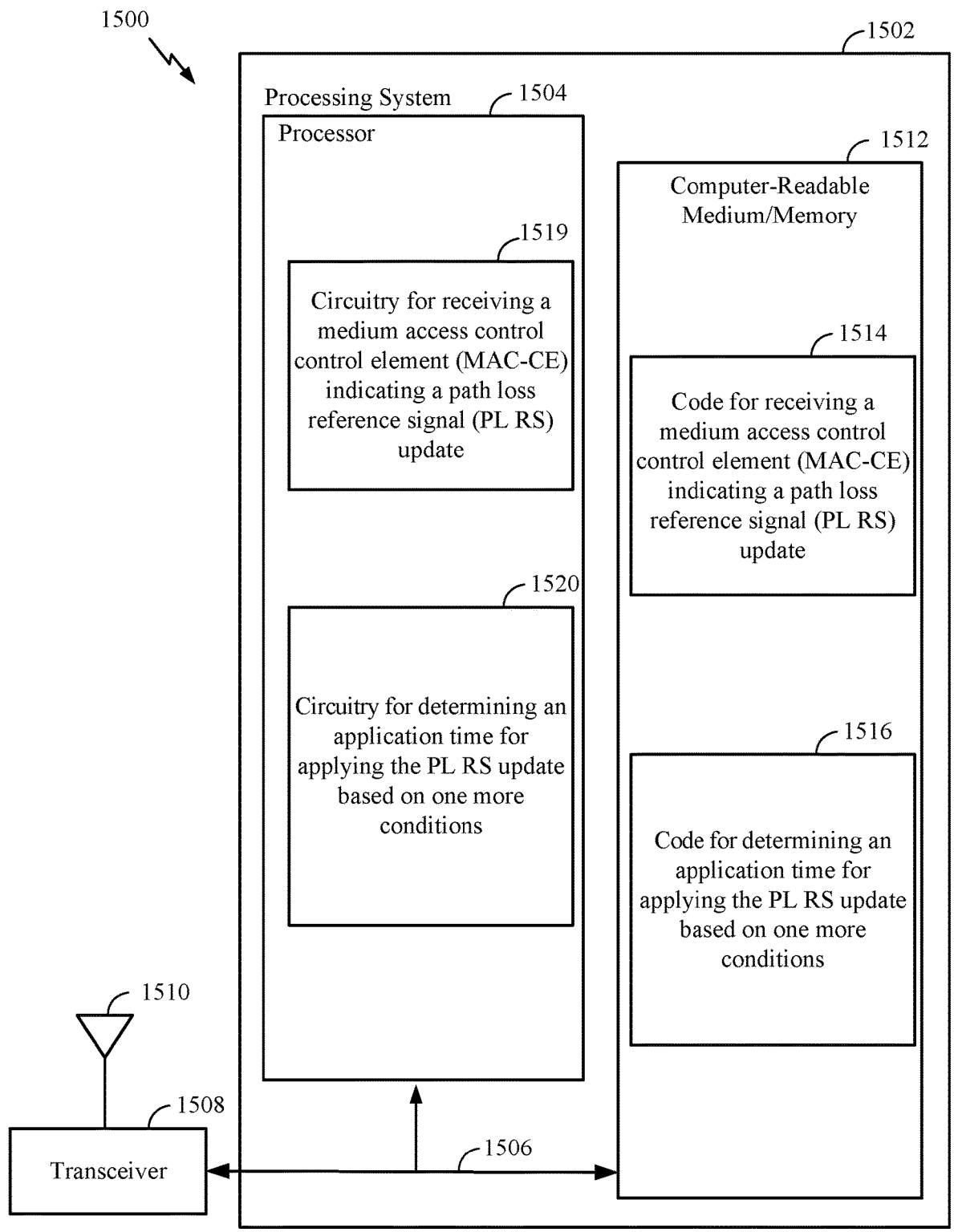
FIG. 15 illustrates a communications device that may include various components configured to perform operations for the techniques disclosed herein, in accordance with aspects of the present disclosure.

FIG. 15 illustrates a communications device 1500 (e.g., a UE) that may include various components (e.g., corresponding to means-plus-function components) configured to perform operations for the techniques disclosed herein, such as the operations 1000 illustrated in FIG. 10. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations 1000 illustrated in FIG. 10, or other operations for performing the various techniques discussed herein. In certain aspects, computer-readable medium/memory 1512 stores code 1514 for receiving a medium access control (MAC) control element (CE) indicating a path loss reference signal (PL RS) update, and code 1516 for determining a time for applying the PL RS update based on one more conditions. In certain aspects, the processor 1504 has circuitry configured to implement the code stored in the computer-readable medium/memory 1515. The processor 1504 includes circuitry 1519 for receiving a medium access control (MAC) control element (CE) indicating a path loss reference signal (PL RS) update, and circuitry 1520 for determining a time for applying the PL RS update based on one more conditions.

Figure 16:
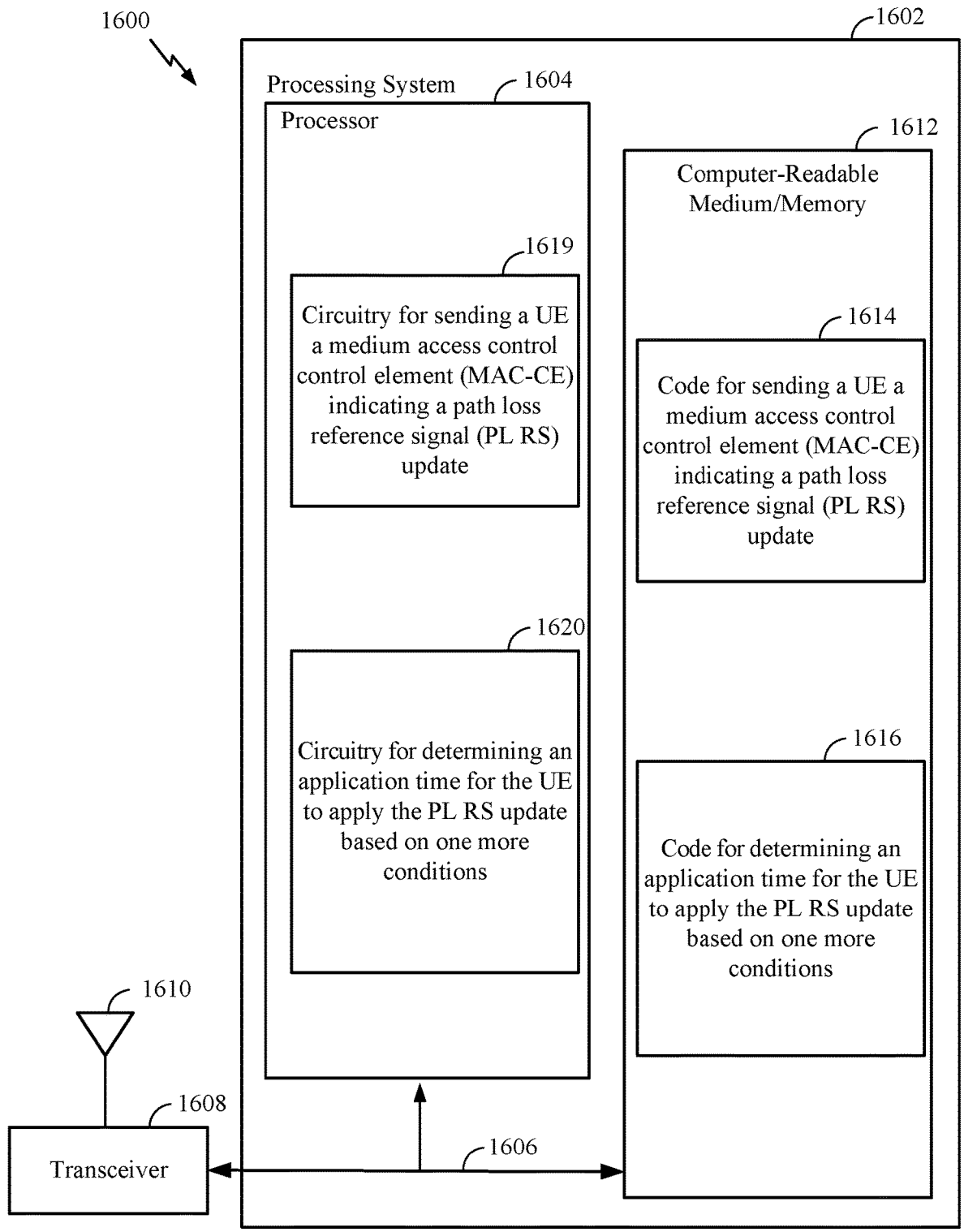
FIG. 16 illustrates a communications device that may include various components configured to perform operations for the techniques disclosed herein, in accordance with aspects of the present disclosure.

FIG. 16 illustrates a communications device 1600 (e.g., a UE) that may include various components (e.g., corresponding to means-plus-function components) configured to perform operations for the techniques disclosed herein, such as the operations 1100 illustrated in FIG. 11. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations 1100 illustrated in FIG. 11, or other operations for performing the various techniques discussed herein. In certain aspects, computer-readable medium/memory 1612 stores code 1614 for sending a UE a medium access control (MAC) control element (CE) indicating a path loss reference signal (PL RS) update, and code 1616 for determining a time for the UE to apply the PL RS update based on one more conditions. In certain aspects, the processor 1604 has circuitry configured to implement the code stored in the computer-readable medium/memory 1612. The processor 1604 includes circuitry 1619 for sending a UE a medium access control (MAC) control element (CE) indicating a path loss reference signal (PL RS) update, and circuitry 1620 for determining a time for the UE to apply the PL RS update based on one more conditions.

Example Aspects

Aspect 1: A method for wireless communication by a user equipment (UE), the method comprising: receiving a medium access control (MAC) control element (CE) indicating a path loss reference signal (PL RS) update; and determining an application time for applying the PL RS update based on one more conditions.

Aspect 2: The method of Aspect 1, wherein the one or more conditions relate to at least one of a total configured number of PL RS for the UE, whether a MAC-CE based PL RS activation feature is enabled, or whether a same PL RS is already measured or maintained for power control of one or more other uplink channels.

Aspect 3: The method of Aspect 1 or 2, wherein the application time is determined to be a period after acknowledgment of the MAC-CE.

Aspect 4: The method of any of Aspects 1-3, wherein the one or more conditions relate to at least one of: a total configured number of PL RS for the UE, whether a MAC-CE based PL RS activation feature is enabled, whether a same PL RS is already measured or maintained for power control of one or more other uplink channels, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE.

Aspect 5: The method of Aspect 4, wherein the certain type comprises at least one of a synchronization signal block (SSB) or a channel state information reference signal (CSI-RS).

Aspect 6: The method of Aspect 4, wherein the application time corresponds to a certain measurement sample of a new PL RS a period after acknowledgment of the MAC-CE.

Aspect 7: The method of Aspect 1, wherein the application time determined for applying the PL RS update is based on a certain time period after an end of acknowledgement (ACK) for physical downlink shared channel (PDSCH) carrying MAC-CE updating physical uplink control channel (PUCCH) spatial relation and a corresponding PL RS.

Aspect 8: The method of Aspect 1, wherein the application time determined for applying the PL RS update is based on a certain number of measurement samples of a new PL RS, counted from a first measurement sample corresponding to a certain time period after the end of ACK for PDSCH carrying MAC-CE updating PUCCH spatial relation and the corresponding PL RS.

Aspect 9: The method of Aspect 1, wherein: the one or more conditions relate to at least one of a total configured number of PL RS for the UE, whether a MAC-CE based PL RS activation feature is enabled, whether a same PL RS is already measured or maintained for power control of one or more other uplink channels, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE; and the application time corresponds to a specific duration after a certain measurement sample of a new PL RS a period after acknowledgment of the MAC-CE.

Aspect 10: The method of Aspect 9, wherein the certain type comprises at least one of a synchronization signal block (SSB) or a channel state information reference signal (CSI-RS).

Aspect 11: The method of Aspect 1, wherein the PL RS is used for power control (PC) of at least one of a physical uplink control channel (PUCCH), a physical uplink shared channel (PUSCH), a sounding reference signal (SRS), or a physical random access channel (PRACH).

Aspect 12: The method of Aspect 11, wherein the PL RS is specified for PC of the PUCCH only.

Aspect 13: A method for wireless communication by a network entity, the method comprising: sending a UE a medium access control (MAC) control element (CE) indicating a path loss reference signal (PL RS) update; and determining an application time for the UE to apply the PL RS update based on one more conditions.

Aspect 14: The method of Aspect 13, wherein the one or more conditions relate to at least one of a total configured number of PL RS for the UE, whether a MAC-CE based PL RS activation feature is enabled, or whether a same PL RS is already measured or maintained for power control of one or more other uplink channels.

Aspect 15: The method of Aspect 13 or 14, wherein the application time is determined to be a period after acknowledgment of the MAC-CE.

Aspect 16: The method of any of Aspects 13-15, wherein the one or more conditions relate to at least one of: a total configured number of PL RS for the UE, whether a MAC-CE based PL RS activation feature is enabled, whether a same PL RS is already measured or maintained for power control of one or more other uplink channels, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE.

Aspect 17: The method of Aspect 16, wherein the certain type comprises at least one of a synchronization signal block (SSB) or a channel state information reference signal (CSI-RS).

Aspect 18: The method of Aspect 16, wherein the application time corresponds to a certain measurement sample of a new PL RS a period after acknowledgment of the MAC-CE.

Aspect 19: The method of Aspect 13, wherein the application time determined for the UE to apply the PL RS update is based on a certain time period after an end of acknowledgement (ACK) for physical downlink shared channel (PDSCH) carrying MAC-CE updating physical uplink control channel (PUCCH) spatial relation and a corresponding PL RS.

Aspect 20: The method of Aspect 13, wherein the application time determined for the UE to apply the PL RS update is based on a certain number of measurement samples of a new PL RS, counted from a first measurement sample corresponding to a certain time period after the end of ACK for PDSCH carrying MAC-CE updating PUCCH spatial relation and the corresponding PL RS.

Aspect 21: The method of Aspect 13, wherein: the one or more conditions relate to at least one of a total configured number of PL RS for the UE, whether a MAC-CE based PL RS activation feature is enabled, whether a same PL RS is already measured or maintained for power control of one or more other uplink channels, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE; and the application time corresponds to a specific duration after a certain measurement sample of a new PL RS a period after acknowledgment of the MAC-CE.

Aspect 22: The method of Aspect 21, wherein the certain type comprises at least one of a synchronization signal block (SSB) or a channel state information reference signal (CSI-RS).

Aspect 23: The method of Aspect 13, wherein the PL RS is used for power control (PC) of at least one of a physical uplink control channel (PUCCH), a physical uplink shared channel (PUSCH), a sounding reference signal (SRS), or a physical random access channel (PRACH).

Aspect 24: The method of Aspect 23, wherein the PL RS is specified for PC of the PUCCH only.

Aspect 25: An apparatus for wireless communication by a user equipment (UE), comprising at least one processor and a memory configured to: receive a medium access control (MAC) control element (CE) indicating a path loss reference signal (PL RS) update; and determine an application time for applying the PL RS update based on one more conditions.

Aspect 26: The apparatus of Aspect 25, wherein the application time determined for applying the PL RS update is based on a certain time period after an end of acknowledgement (ACK) for physical downlink shared channel (PDSCH) carrying MAC-CE updating physical uplink control channel (PUCCH) spatial relation and a corresponding PL RS.

Aspect 27: The apparatus of Aspect 25, wherein the application time determined for applying the PL RS update is based on a certain number of measurement samples of a new PL RS, counted from a first measurement sample corresponding to a certain time period after the end of ACK for PDSCH carrying MAC-CE updating PUCCH spatial relation and the corresponding PL RS.

Aspect 28: An apparatus for wireless communication by a network entity, the method comprising at least one processor and a memory configured to: send a UE a medium access control (MAC) control element (CE) indicating a path loss reference signal (PL RS) update; and determine an application time for the UE to apply the PL RS update based on one more conditions.

Aspect wherein the application time determined for the UE to apply the PL RS update is based on a certain time period after an end of acknowledgement (ACK) for physical downlink shared channel (PDSCH) carrying MAC-CE updating physical uplink control channel (PUCCH) spatial relation and a corresponding PL RS.

Aspect wherein the application time determined for the UE to apply the PL RS update is based on a certain number of measurement samples of a new PL RS, counted from a first measurement sample corresponding to a certain time period after the end of ACK for PDSCH carrying MAC-CE updating PUCCH spatial relation and the corresponding PL RS.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
receiving a medium access control control element (MAC-CE) indicating a path loss reference signal (PL RS) update for an uplink channel; and
determining an application time for applying the PL RS update based at least in part on whether a same PL RS is previously maintained for PL estimation of one or more other uplink channels.

2. The method of claim 1, wherein the determining further comprises determining the application time for applying the PL RS update based at least on one of a total configured number of PL RS for the UE or whether a MAC-CE based PL RS activation feature is enabled.

3. The method of claim 1, wherein the application time is determined to be a period after acknowledgment of the MAC-CE.

4. The method of claim 1, wherein the determining further comprises determining the application time for applying the PL RS update based at least on one of: a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE.

5. The method of claim 4, wherein the certain type comprises at least one of a synchronization signal block (SSB) or a channel state information reference signal (CSI-RS).

6. The method of claim 4, wherein the application time corresponds to a certain measurement sample of a new PL RS a period after acknowledgment of the MAC-CE.

7. The method of claim 1, wherein the application time determined for applying the PL RS update is based on a certain time period after an end of acknowledgement (ACK) for physical downlink shared channel (PDSCH) carrying MAC-CE updating physical uplink control channel (PUCCH) spatial relation and a corresponding PL RS.

8. The method of claim 1, wherein the application time determined for applying the PL RS update is based on a certain number of measurement samples of a new PL RS, counted from a first measurement sample corresponding to a certain time period after the end of ACK for PDSCH carrying MAC-CE updating PUCCH spatial relation and the corresponding PL RS.

9. The method of claim 1, wherein the determining further comprises determining the application time for applying the PL RS update based at least on one of a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE; and
wherein the application time corresponds to a specific duration after a certain measurement sample of a new PL RS a period after acknowledgment of the MAC-CE.

10. The method of claim 9, wherein the certain type comprises at least one of a synchronization signal block (SSB) or a channel state information reference signal (CSI-RS).

11. The method of claim 1, wherein the PL RS is used for power control (PC) of at least one of a physical uplink control channel (PUCCH), a physical uplink shared channel (PUSCH), a sounding reference signal (SRS), or a physical random access channel (PRACH).

12. The method of claim 11, wherein the PL RS is specified for PC of the PUCCH.

13. A method for wireless communication by a network entity, the method comprising:
sending a user equipment (UE) a medium access control control element (MAC-CE) indicating a path loss reference signal (PL RS) update for an uplink channel; and
determining an application time for the UE to apply the PL RS update based at least in part on whether a same PL RS is previously maintained for PL estimation of one or more other uplink channels.

14. The method of claim 13, wherein the determining further comprises determining the application time for the UE to apply the PL RS update based at least on one of a total configured number of PL RS for the UE or whether a MAC-CE based PL RS activation feature is enabled.

15. The method of claim 13, wherein the application time is determined to be a period after acknowledgment of the MAC-CE.

16. The method of claim 13, wherein the determining further comprises determining the application time for the UE to apply the PL RS update based at least on one of: a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE.

17. The method of claim 16, wherein the certain type comprises at least one of a synchronization signal block (SSB) or a channel state information reference signal (CSI-RS).

18. The method of claim 16, wherein the application time corresponds to a certain measurement sample of a new PL RS a period after acknowledgment of the MAC-CE.

19. The method of claim 13, wherein the application time determined for the UE to apply the PL RS update is based on a certain time period after an end of acknowledgement (ACK) for physical downlink shared channel (PDSCH) carrying MAC-CE updating physical uplink control channel (PUCCH) spatial relation and a corresponding PL RS.

20. The method of claim 13, wherein the application time determined for the UE to apply the PL RS update is based on a certain number of measurement samples of a new PL RS, counted from a first measurement sample corresponding to a certain time period after the end of ACK for PDSCH carrying MAC-CE updating PUCCH spatial relation and the corresponding PL RS.

21. The method of claim 13, wherein the determining further comprises determining the application time for the UE to apply the PL RS update based at least on one of a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE; and
wherein the application time corresponds to a specific duration after a certain measurement sample of a new PL RS a period after acknowledgment of the MAC-CE.

22. The method of claim 21, wherein the certain type comprises at least one of a synchronization signal block (SSB) or a channel state information reference signal (CSI-RS).

23. The method of claim 13, wherein the PL RS is used for power control (PC) of at least one of a physical uplink control channel (PUCCH), a physical uplink shared channel (PUSCH), a sounding reference signal (SRS), or a physical random access channel (PRACH).

24. The method of claim 23, wherein the PL RS is specified for PC of the PUCCH.

25. An apparatus for wireless communication by a user equipment (UE), comprising:
at least one processor and a memory configured to
receive a medium access control control element (MAC-CE) indicating a path loss reference signal (PL RS) update for an uplink channel; and
determine an application time for applying the PL RS update based at least in part on whether a same PL RS is previously maintained for PL estimation of one or more other uplink channels.

26. The apparatus of claim 25, wherein the application time determined for applying the PL RS update is based on a certain time period after an end of acknowledgement (ACK) for physical downlink shared channel (PDSCH) carrying MAC-CE updating physical uplink control channel (PUCCH) spatial relation and a corresponding PL RS.

27. The apparatus of claim 25, wherein the application time determined for applying the PL RS update is based on a certain number of measurement samples of a new PL RS, counted from a first measurement sample corresponding to a certain time period after the end of ACK for PDSCH carrying MAC-CE updating PUCCH spatial relation and the corresponding PL RS.

28. The apparatus of claim 25, wherein the application time determined for applying the PL RS update is further based on one of: a total configured number of PL RS for the UE or whether a MAC-CE based PL RS activation feature is enabled.

29. The apparatus of claim 25, wherein the application time is a period after an acknowledgment of the MAC-CE.

30. The apparatus of claim 25, wherein the application time determined for applying the PL RS update is further based on one of: a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE.

31. The apparatus of claim 30, wherein the certain type comprises at least one of a synchronization signal block (SSB) or a channel state information reference signal (CSI-RS).

32. The apparatus of claim 30, wherein the application time corresponds to a certain measurement sample of a new PL RS a period after acknowledgment of the MAC-CE.

33. The apparatus of claim 25, wherein the application time determined for applying the PL RS update is further based on one of: a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE; and wherein the application time corresponds to a specific duration after a certain measurement sample of a new PL RS a period after acknowledgment of the MAC-CE.

34. The apparatus of claim 33, wherein the certain type comprises at least one of a synchronization signal block (SSB) or a channel state information reference signal (CSI-RS).

35. The apparatus of claim 25, wherein:
the PL RS is used for power control (PC) of at least one of a physical uplink control channel (PUCCH), a physical uplink shared channel (PUSCH), a sounding reference signal (SRS), or a physical random access channel (PRACH); and
the PL RS is specified for PC of the PUCCH.

36. An apparatus for wireless communication by a network entity, comprising:
at least one processor and a memory configured to:
send a user equipment (UE) a medium access control control element (MAC-CE) indicating a path loss reference signal (PL RS) update for an uplink channel; and
determine an application time for the UE to apply the PL RS update based at least in part on whether a same PL RS is previously maintained for PL estimation of one or more other uplink channels.

37. The apparatus of claim 36, wherein the application time determined for applying the PL RS update is a period after an acknowledgment of the MAC-CE.

38. The apparatus of claim 36, wherein the application time determined for the UE to apply the PL RS update is further based on at least on one of: a total configured number of PL RS for the UE or whether a MAC-CE based PL RS activation feature is enabled.

39. The apparatus of claim 36, wherein the application time determined for the UE to apply the PL RS update is further based on at least on one of: a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE.

40. The apparatus of claim 39, wherein the certain type comprises at least one of a synchronization signal block (SSB) or a channel state information reference signal (CSI-RS).

41. The apparatus of claim 39, wherein the application time corresponds to a certain measurement sample of a new PL RS a period after an acknowledgment of the MAC-CE.

42. The apparatus of claim 36, wherein the application time determined for the UE to apply the PL RS update is a certain time period after an end of acknowledgement (ACK) for physical downlink shared channel (PDSCH) carrying MAC-CE updating physical uplink control channel (PUCCH) spatial relation and a corresponding PL RS.

43. The apparatus of claim 36, wherein the application time determined for the UE to apply the PL RS update is further based on a certain number of measurement samples of a new PL RS, counted from a first measurement sample corresponding to a certain time period after the end of ACK for PDSCH carrying MAC-CE updating PUCCH spatial relation and the corresponding PL RS.

44. The apparatus of claim 36, wherein the application time determined for the UE to apply the PL RS update is further based on at least on one of: a total configured number of PL RS for the UE, whether a MAC-CE based PL RS activation feature is enabled, if the PL RS has a configured transmission configuration indicator (TCI) state and the TCI state is known by the UE, if the PL RS has no configured TCI state and the PL RS is of a certain type, or if the PL RS has no configured TCI state and the PL RS is known to the UE; and wherein the application time corresponds to a specific duration after a certain measurement sample of a new PL RS a period after acknowledgment of the MAC-CE.

45. The apparatus of claim 44, wherein the certain type comprises at least one of a synchronization signal block (SSB) or a channel state information reference signal (CSI-RS).

46. The apparatus of claim 36, wherein:
the PL RS is used for power control (PC) of at least one of a physical uplink control channel (PUCCH), a physical uplink shared channel (PUSCH), a sounding reference signal (SRS), or a physical random access channel (PRACH); and
the PL RS is specified for PC of the PUCCH.

* * * * *